US008423879B2

(12) United States Patent
Bhatt et al.

(10) Patent No.: US 8,423,879 B2
(45) Date of Patent: Apr. 16, 2013

(54) METHOD AND APPARATUS FOR TEST GENERATION FROM HYBRID DIAGRAMS WITH COMBINED DATA FLOW AND STATECHART NOTATION

(75) Inventors: Devesh Bhatt, Maple Grove, MN (US); Kirk Schloegel, Golden Valley, MN (US); Stephen O Hickman, Eagan, MN (US); David Oglesby, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 1225 days.

(21) Appl. No.: 12/247,882

(22) Filed: Oct. 8, 2008

(65) Prior Publication Data
US 2009/0287958 A1 Nov. 19, 2009

Related U.S. Application Data

(60) Provisional application No. 61/053,205, filed on May 14, 2008.

(51) Int. Cl.
*G06F 7/02* (2006.01)
(52) U.S. Cl.
USPC ........... 714/819; 717/104; 717/105; 717/125; 717/132; 703/13; 703/14; 703/21
(58) Field of Classification Search .................. 717/132, 717/104–105, 124, 125; 703/13–14, 21
See application file for complete search history.

(56) References Cited

U.S. PATENT DOCUMENTS

| 5,150,367 | A | | 9/1992 | Tong et al. |
|---|---|---|---|---|
| 5,272,704 | A | | 12/1993 | Tong et al. |
| 5,572,436 | A | * | 11/1996 | Dangelo et al. ............... 716/102 |
| 5,729,554 | A | | 3/1998 | Weir et al. |
| 5,913,023 | A | | 6/1999 | Szermer |
| 5,918,037 | A | | 6/1999 | Tremblay |

(Continued)

FOREIGN PATENT DOCUMENTS

| EP | 1577755 | 9/2005 |
|---|---|---|
| EP | 1577755 A2 | 9/2005 |
| EP | 1666187 A1 | 5/2006 |
| EP | 1677187 | 7/2006 |

OTHER PUBLICATIONS

Wieringa, "Semantics and verification of UML activity diagramas for workflow modelling", 2002, Rik Eshuis, p. 2-240.*

(Continued)

*Primary Examiner* — Scott Baderman
*Assistant Examiner* — Jeison C Arcos
(74) *Attorney, Agent, or Firm* — Fogg & Powers LLC

(57) ABSTRACT

A test generator and methods for generating tests from a hybrid diagram are provided. A hybrid diagram is a diagram that primarily uses one higher-level semantic notation with portions utilizing one or more secondary higher-level semantic notations. Example higher-level semantic notations are statechart notation and data-flow notation. A test generator processes the hybrid diagram without reducing the higher-level semantic constructs to lower-level semantic constructs. The test generator generates test-generation templates as needed based on the higher-level semantic model used in the diagram. The test generator uses the test-generation templates to generate tests for a system-performing device specified by the diagram. The generated tests may be executed automatically by a test driver or manually by a human tester.

20 Claims, 6 Drawing Sheets

U.S. PATENT DOCUMENTS

| | | | |
|---|---|---|---|
| 6,002,869 | A | 12/1999 | Hinckley |
| 6,173,440 | B1 | 1/2001 | Darty |
| 6,195,616 | B1* | 2/2001 | Reed et al. ............ 702/119 |
| 6,449,667 | B1 | 9/2002 | Ganmukhi et al. |
| 6,473,794 | B1 | 10/2002 | Guheen et al. |
| 6,570,459 | B1 | 5/2003 | Nathanson et al. |
| 6,615,166 | B1 | 9/2003 | Guheen et al. |
| 6,671,874 | B1 | 12/2003 | Passova |
| 6,938,228 | B1 | 8/2005 | Zhong |
| 6,944,848 | B2 | 9/2005 | Hartman et al. |
| 7,051,322 | B2 | 5/2006 | Rioux |
| 7,219,328 | B2 | 5/2007 | Schloegel et al. |
| 7,272,752 | B2 | 9/2007 | Farchi et al. |
| 7,296,188 | B2 | 11/2007 | Paternostro et al. |
| 7,412,430 | B1 | 8/2008 | Moore |
| 7,457,729 | B2 | 11/2008 | Khoche et al. |
| 7,490,319 | B2 | 2/2009 | Blackwell et al. |
| 7,644,334 | B2 | 1/2010 | Hickman et al. |
| 7,698,668 | B2 | 4/2010 | Balasubramanian et al. |
| 7,735,058 | B2 | 6/2010 | Kinsella et al. |
| 2003/0014703 | A1* | 1/2003 | Chakravarthy et al. ....... 714/726 |
| 2003/0128214 | A1 | 7/2003 | Oglesby et al. |
| 2004/0044990 | A1 | 3/2004 | Schloegel et al. |
| 2004/0088677 | A1 | 5/2004 | Williams |
| 2004/0143811 | A1* | 7/2004 | Kaelicke et al. ............. 717/101 |
| 2004/0169591 | A1 | 9/2004 | Erkkinen |
| 2005/0004786 | A1 | 1/2005 | Thomason |
| 2005/0043913 | A1 | 2/2005 | Hyde et al. |
| 2005/0097515 | A1 | 5/2005 | Ribling |
| 2005/0114841 | A1 | 5/2005 | Moskowitz et al. |
| 2005/0223295 | A1* | 10/2005 | Hermes et al. ................... 714/38 |
| 2006/0010428 | A1 | 1/2006 | Rushby et al. |
| 2006/0101402 | A1 | 5/2006 | Miller et al. |
| 2006/0155411 | A1* | 7/2006 | Khoche et al. ................ 700/108 |
| 2006/0155520 | A1 | 7/2006 | O'Neill et al. |
| 2006/0206870 | A1 | 9/2006 | Moulden, Jr. et al. |
| 2006/0253839 | A1 | 11/2006 | Avritzer et al. |
| 2006/0265691 | A1* | 11/2006 | Klinger et al. ................ 717/124 |
| 2007/0028219 | A1 | 2/2007 | Miller et al. |
| 2007/0028220 | A1 | 2/2007 | Miller et al. |
| 2007/0266366 | A1 | 11/2007 | Bucuvalas |
| 2007/0288899 | A1 | 12/2007 | Fanning et al. |
| 2008/0015827 | A1 | 1/2008 | Tryon, III et al. |
| 2008/0028364 | A1 | 1/2008 | Triou et al. |
| 2008/0086705 | A1 | 4/2008 | Balasubramanian et al. |
| 2008/0120521 | A1 | 5/2008 | Poisson et al. |
| 2008/0126902 | A1* | 5/2008 | Hickman et al. .............. 714/741 |
| 2009/0083699 | A1 | 3/2009 | Santhanam |
| 2009/0287958 | A1 | 11/2009 | Bhatt et al. |
| 2009/0287963 | A1* | 11/2009 | Oglesby et al. ................... 714/38 |
| 2010/0175052 | A1 | 7/2010 | Prasad et al. |
| 2010/0192128 | A1 | 7/2010 | Schloegel et al. |
| 2011/0054835 | A1 | 3/2011 | Takamasu et al. |
| 2011/0258607 | A1 | 10/2011 | Bhatt et al. |

OTHER PUBLICATIONS

Schatz, "Model-Based Development of Embedded systems", 2002, Institut für Informatik, Technische Universitat Munchen, p. 1-13.*
Hong, "Automatic Test generation form statecharts using model checking", 2001, University of Pennsylvania, p. 1-29.*
Pasareanu, "Model based analysis and test generation for flight software", Sep. 2008, NASA Ames Research Center, p. 1-11.*
Kansomkeat, "Automated-Generating Test Case Using UML Statechart Diagrams", 2003, SAICSIT, p. 296-300.*
Abdurazik, "Generating Test Cases from UML Specifications", 1999, Information and Software Engineering George Mason University, p. 1-111.*
Bhatt, "Model-Based Development and the Implications to Design Assurance and Certification", 2005, IEEE, p. 1-13.*
Neema, "Signal Processing Platform: A Tool Chain for Designing High Performance Signal Processing Applications" 2005, IEEE, p. 302-307.*
Anirudhan et al., "Symbolic Test Generation for Hierarchically Modeled Digital Systems", "International Test Conference 1989", 1989, pp. 461-469, Publisher: IEEE, Published in: Washington DC, USA.
Hi-Keung Tony Ma et al., "Test Generation for Sequential Circuits", "IEEE Transactions on Computer Aided Design of Integrated Circuits and Systems", Oct. 1, 1988, pp. 1081-1093, vol. 7, No. 10, Publisher: IEEE, Published in: Piscataway, NJ, USA.
Niermann et al., "HITEC: A Test Generation Package for Sequential Circuits ", "Proceedings of the European Conference on Design Automation ", 1991, pp. 214-218, Publisher: IEEE , Published in: Los Alamitos, CA, USA.
An Approach and Tool for Test Generation from Model-Based Functional Requirements, Bhatt et al., May 2007, all pages.
HiLiTE—Honeywell Integrated Lifecycle Tools and Environment, Bhatt et al., Slides Version 2, Apr. 2008, all pages.
OMG Unified Modeling Language Specification, version 1.5, Object Management Group (OMG), Mar. 1, 2003, all pages.
Stateflow 7—Design and Simulate State Machines and Control Logic, The MathWorks, 2007, all pages.
Simulink 7—Simulation and Model-Based Design, The MathWorks, 2007, all pages.
"Interval Arithmetic and Automatic Error Analysis in Digital Computing", R.E. Moore, Nov. 1962, all pages.
K. Schloegel et al., "Method, Apparatus, and System for Automatic Test Generation from Statecharts", U.S. Appl. No. 12/136,146, filed Jun. 10, 2008.
Agrawal et al., "Semantic Translation of Simulink/Stateflow Models to Hybrid Automata Using Graph Transformations", "Electronic Notes in Theoretical Computer Science", 2004, pp. 43-56, vol. 109.
Alur et al., "Symbolic Analysis for Improving Simulation Coverage of Simulink/Stateflow Models", "EMSOFT'08", Oct. 19-24, 2008, pp. 89-98, Published in: Atlanta, Georgia, USA.
Alur, "A Theory of Timed Automata", "Theoretical Computer Science", Apr. 1994, pp. 183-235, vol. 126, Publisher: Elsevier Science B.V.
Alur, "The Algorithmic Analysis of Hybrid Systems", "Theoretical Computer Science", Feb. 1995, pp. 3-34, No. 138.
Anirudhan et al, "Symbolic Test Generation for Hierarchically Modeled Digital Systems", "International Test Conference 1989", 1989, pp. 461-469, Publisher: IEEE, Published in: Washington DC, USA.
Benveniste, "The Synchronous Languages 12 Years Later", "Proceedings of the IEEE", Jan. 2003, pp. 64-83, vol. 91, No. 1, Publisher: IEEE.
Bhatt, D. et al., "Model-Based Development and the Implications to Design Assurance and Certification", "Digital Avionics Systems Conference", Oct. 30, 2005, pp. 1-14, vol. 2, Publisher: IEEE.
Bhatt et al., "Towards Scalable Verification of Commercial Avionics Software", "Proceedings of the AIAA Infotech@Aerospace Conference", Apr. 2010, pp. 1-8, Publisher: American Institue of Aeronautics and Astronautics, Published in: USA.
Bhatt et al., "HiLITE: An Approach and Tool for Test Generation from Model-Based Functional Requirements", "Presentation—1st International Workshop on Aerospace Software Engineering", May 22, 2007, pp. 1-32, Publisher: Honeywell International Inc.
Bhatt, "Towards Scalable Verification of Commercial Avionics Software", "In Proceedings of the AIAA Infotech at Aerospace Conference", Apr. 2010, pp. 1-7, Publisher: American Institute of Aeronautics and Astronautics.
Bhatt, "An Approach and Tool for Test Generation From Model-Based Functional Requirements", May 2007, pp. 1-6, Publisher: Honeywell Laboratories, Minneapolis.
Bhatt, D. et al., "HiLite-Honeywell Integrated Lifecycle Tools and Environment", "Aerospace Advanced Technology-Slides Version 2", Apr. 2008, pp. 1-28, Publisher: Honeywell.
Durrieu , "Formal Proof and Test Case Generation for Critical Embedded Systems Using Scade", "World Computer Congress-IFIP", 2004, pp. 499-504, vol. 156.
Ferrell, "RTCA DO-17B/EUROCAE ED-12B", 2001, pp. 1-11, No. 27, Publisher: CRC Press LLC.
Fosdick, et al., "Data Flow Analysis in Software Reliability", "Computing Surveys", Sep. 1976, pp. 305-330, vol. 8, No. 3, Publisher: Association for Computing Machinery (ACM), Published in: Boulder, Colorado, US.
Halbwachs et al., "The Synchronous Dataflow Programming Language Lustre", "Proceedings of the IEEE", Sep. 1991, pp. 1-41, vol. 79, No. 9, Publisher: IEEE.

Hamon, "An Operational Semantics for Stateflow", "International Journal on Software Tools for Technology Transfer (STTT)", Oct. 2007, pp. 447-456, vol. 9, No. 5-6, Publisher: SRI International.

Hamon, "A Denotational Semantics for Stateflow", "In Proceedings of EMSOFT", 2005, pp. 164-172, Publisher: EMSOFT '05.

Harel, "Statecharts: A Visual Formalism for Complex Systems", "Science of Computer Programming", 1987, pp. 231-274, vol. 8, Publisher: Elsevier Science Publishers B.V.

Henzinger et al., "What's Decidable About Hybrid Automata?", "Journal of Computer and System Sciences", 1998, pp. 1-48, vol. 57.

Hi-Keung, "Test Generation for Sequential Circuits", "IEEE Transactions on Computer Aided Design of Integrated Circuits and Systems", Oct. 1, 1988, pp. 1081-1093, vol. 7, No. 10, Publisher: IEEE, Published in: Piscataway, NJ, USA.

"LDRA Tool Suite", "http://www.ldra.com/ Accessed May 11, 2011", 2011, p. 1 Publisher: LDRA Ltd.

"Mathlab and Simulink", "http://www.mathworks.com/ Accessed May 11, 2011", 1994-2011, p. 1 Publisher: The MathWorks, Inc.

"Vector Software. Vectorcast.", "http://www.vectorcast.com/ Accessed on May 11, 2011", 2011, p. 1 Publisher: Vector Software.

Kahn, "The Semantics of a Simple Language for Parallel Programming", "In Information Processing", 1974, pp. 471-475.

Lee, "Synchronous Data Flow", "Proceedings of IEEE", Sep. 1987, pp. 1235-1245, vol. 75, No. 9, Publisher: IEEE.

"Simulink—Simulation and Model-Based Design", "http://www.mathworks.com/products/simulink accessed Sep. 1, 2010", 2007, pp. 1-6, Publisher: The MathWorks, Inc.

Moore, R.E., "Interval Arithmetic and Automatic Error Analysis in Digital Computing", "Applied Mathematics and Statistics Laboratories", Nov. 15, 1962, pp. 1-145, No. 25, Publisher: Stanford University California.

Neema, S. et al., "Signal Processing Platform: A Tool Chain for Designing High Performance Signal Processing Applications", "Proceedings IEEE", Apr. 8-10, 2005, pp. 302-307, Publisher: Southeastcon, Published in: Ft. Lauderdale, FL.

Niermann et al., "HITEC: A Test Generation Package for Sequential Circuits", "Proceedings of the European Conference on Design Automation", 1991, pp. 214-218, Publisher: IEEE, Published in: Los Alamitos, CA, USA.

"OMG Unified Modeling Language Specification, version 1.5", Mar. 1, 2003, pp. 3-135 to 3-154, vol. 3, No. 9, Publisher: Object Management Group (OMG).

Ouaknine, "On the Language Inclusion Problem for Timed Automata: Closing a Decidability Gap", "In Proceedings of Logic in Computer Science", 2004, pp. 54-63.

Petri, "Communication With Automata", "PhD Thesis", Jan. 1966, pp. 1-97, vol. 1, Publisher: University of Bonn.

Rushby, "An Evidential Tool Bus", "Proc. of 7th International Conference on Formal Engineering Methods", 2005, pp. 1-10, Publisher: SRI International, Published in: Menlo Park, California, USA.

"Quantifying Error Propagation in Data Flow Models", "Obtained Apr. 12, 2011", Apr. 12, 2011, pp. 1-10, Publisher: Honeywell Aerospace Advanced Technology.

Schulte et al, "Dynamic Analysis of Bounds Versus Domain Propagation", "Logic Programming", Dec. 9, 2008, pp. 332-346, Publisher: Springer Berlin Heidelberg.

Sorensen, Uffe, "Static Single-Assignment Form and Value Range Propagation for UPPAAL", "available at http://www.uffesorensen.dk/Uni/dat8/SSA_and_VRP_for_UPPAAL.pdf", Jun. 2008, pp. 1-81.

"Stateflow 7-Design and Simulate State Machines and Control Logic", 2007, pp. 1-6, Publisher: The Mathworks.

Tiwari, "Formal Semantics and Analysis Methods for Simulink Stateflow Models", "http://www.csl.sri.com/users/tiwari/html/stateflow.html Accessed May 11, 2011", 2002, pp. 1-12, Publisher: SRI International.

Tripakis et al., "Translating Discrete-Time Simulink to Lustre", "ACM Journal Name", Jan. 2005, pp. 1-40, vol. V, No. N.

Bhatt, "Method for Automated Error Detection and Verification of Software", "U.S. Appl. No. 12/949,596, filed Nov. 18, 2010", pp. 1-16.

Schloegel, "Error Propagation in a System Model", "U.S. Appl. No. 13/167,983, filed Jun. 24, 2011", Jun. 24, 2011.

"SCADE Suite", "http://www.esterel-technologies.com/ Accessed May 11, 2011", 2011, pp. 1-4, Publisher: Esterel Technologies, Inc., Published in: France.

Zhou et al., "A Framework of Hierarchical Requirements Patterns for Specifying Systems of Interconnected Simulink/Stateflow Modules", 2007, pp. 1-6.

* cited by examiner

METHOD AND APPARATUS FOR TEST GENERATION FROM HYBRID DIAGRAMS WITH COMBINED DATA FLOW AND STATECHART NOTATION

RELATED APPLICATIONS

The present application claims priority to U.S. Provisional Patent Application No. 61/053,205, filed on May 14, 2008, entitled "Method and Apparatus for Hybrid Test Generation from Diagrams with Combined Data Flow and Statechart Notation," the entire contents of which are hereby incorporated by reference herein.

FIELD OF THE INVENTION

The present invention relates to automated test generation and execution, and more particularly, to automated test generation and execution of test cases generated from hybrid data flow and statechart diagrams.

BACKGROUND

Verification of safety critical software is a difficult problem—with associated large amounts of time and cost. Model-based development (MBD) tools are widely used to specify algorithms for control systems (such as flight controls, engine controls, navigation, etc.) so that tests can be automatically created to verify that the implementation of the block diagrams in the control systems correctly implements the specified algorithms. This automation of test generation has great potential for significantly reducing the verification cost and time; especially when the tests are generated to test for the specific "algorithm requirements" implied by the semantics of a data-flow or statechart diagram.

In an MBD tool modeling notation, an algorithm may be specified by a data-flow block diagram, a statechart, or a combination diagram where statecharts are embedded as data-flow blocks in a data-flow diagram (or vice versa). More generally, a "hybrid diagram" is a diagram where two or more types of semantic notation are used, such as data-flow notation, statechart notation, and/or sequence diagram notation. Requirements-driven test generation techniques have been proposed and implemented for pure data-flow diagrams and pure statecharts.

The algorithm may be expressed using a "diagram" made up of "nodes" and "arcs". A diagram may be described textually and/or pictorially. A node in a diagram may also contain an internal diagram. The internal diagram can be referred to as a sub-diagram, where each sub-diagram may be comprises of nodes that have internal diagrams or sub-sub-diagrams, and so on. Typically, this hierarchy of diagram, sub-diagram, sub-sub-diagram, etc. is expressed in parent/child relationship terms. Generally speaking, any given node (or set of nodes) within the diagram may have ancestors, including a parent diagram, that ultimately lead up to the top-level diagram. Also, the given node may have child sub-diagram(s), sub-sub-diagram(s), etc. as well. As a special case, the top-level diagram may be thought of as the ultimate parent diagram. A top-level diagram may also be called a model.

A data-flow diagram is a directed, possibly cyclic, diagram where each node in the diagram performs some type of function, and the arcs connecting nodes indicate how data flow from one node to another. A node of the data flow diagram is also called a "block", and each block has a block type. Blocks may have multiple incoming arcs and multiple outgoing arcs. Each end of an arc is connected to a block via a "port". Ports are unidirectional—information either flows in or out, but not both. An "input port" may have at most one incoming arc, but an "output port" can have an unlimited number of outgoing arcs. Blocks without incoming arcs are considered "input blocks" and blocks without outgoing arcs are considered "output blocks".

A statechart is a directed, possibly cyclic, diagram that comprises a plurality of nodes called "states" and a plurality of arcs called "transitions", each of which indicates a path from a source state to a destination state. Each transition may comprise one or more "conditions" or prerequisites that must be satisfied before traversing the transition. Each state may specify one or more "statechart-defined variables" which are used within the statechart to store a value. A statechart may comprise one or more "statechart-input variables", or values provided to the device before performing the system function, and one or more "statechart-output variables", or values output by the device after performing the system function. Each condition may be expressed in terms of the statechart-defined variables, the statechart-input variables and/or the statechart-output variables.

A sequence diagram is a directed diagram that presents an interaction, or a set of arcs called "messages" between a set of nodes called "objects" to effect a desired operation or result. The sequence diagram has two dimensions: a time dimension (typically a vertical axis) and an object dimension (typically a horizontal axis). As the time dimension normally proceeds down the vertical axis, messages that occur later in time often are shown in sequence diagrams as below earlier messages. There is no significance to the ordering of messages along the object dimension.

Hybrid diagrams may be useful to specify requirements for a device or system naturally specified in terms of multiple semantic notations. For example, a cruise control device for an automobile may naturally be described as having states, such as "cruise control engaged", "cruise control accelerating", "cruise control decelerating", "cruise control disengaged", etc. The information within each state may be modeled using a data flow technique that indicates how information streams between program modules, tasks, processes, or threads that implement the state, such as indicating that a "desired speed" value may be set by a "cruise_control_UI" user interface thread and read by a "cruise_control_engine_interface" engine interface thread to determine if the automobile should accelerate, decelerate, or maintain speed.

For hybrid diagrams, however, the current state-of-the-art comprises two main approaches. The first approach is to transform the hybrid diagram using a lower-level notation that supports both the dataflow and statechart semantics. For example, current model checker tools transform the diagram using a lower-level notation, such as a program-counter and variable-state notation. The second approach is to generate random values for the inputs of the diagram and to compute the expected output values through hybrid model simulation.

SUMMARY

Embodiments of the present application include a method, system, and apparatus for generating tests from hybrid diagrams.

A first embodiment of the invention provides a method for generating tests. A test generator is initialized. A diagram representing requirements for a system-performing device is input. The diagram includes a plurality of nodes and a plurality of arcs. Each arc connects one or more of the plurality of nodes. The plurality of nodes includes a plurality of embedded nodes. Each node in the plurality of nodes belongs to a primary semantic notation, except for the plurality of embedded nodes. Each embedded node in the plurality of embedded nodes includes one or more sub-diagrams belonging to a secondary semantic notation that is not the same as the primary semantic notation. A propagation method is used to propagate type and range information (TRI) through the diagram and to determine test-generation templates for each node in the plurality of nodes. The TRI is propagated and test-generation templates generated based on the primary semantic notation for each node in the plurality of nodes except for the embedded nodes. The TRI is propagated and test-generation templates generated for each node in the plurality of embedded nodes based on the secondary semantic notation. Tests are generated for the diagram based on the plurality of test-generation templates.

A second embodiment of the invention provides a method for generating tests representing requirements for a system-performing device from a diagram. The diagram includes a plurality of nodes, including a plurality of embedded nodes, and a plurality of arcs. Each arc connects one or more of the plurality of nodes. Each node in the plurality of nodes belongs to a primary semantic notation, except for the plurality of embedded nodes. Each embedded node in the plurality of embedded nodes includes one or more sub-diagrams belonging to a secondary semantic notation that is not the same as the primary semantic notation. A plurality of test-generation templates are received into a test-generation-template data structure. Each test-generation template represents an associated node of the diagram. A test-generation template from the test-generation-template data structure and an associated node for the test-generation template are selected. The test-generation-template data structure is updated based on the selected test-generation template. Inputs are projected upstream along a first path from the associated node to a plurality of affectable input points. The inputs are projected based on the semantic notation of nodes in the first path. Expected outputs are propagated down-stream along a second path from the associated node to a plurality of measurable observation points. The expected outputs are propagated based on the semantic notation of nodes in the second path. A test is generated based on the selected test-generation template. A determination is made that another test-generation template in the plurality of test-generation templates is to be processed, based on the test-generation-template data structure.

A third embodiment of the invention provides a test generator. The test generator includes a computer processor, data storage, and machine-language instructions. The machine-language instructions are stored in the data storage and executable by the computer processor to perform functions. The test generator is initialized. A diagram representing requirements for a system-performing device is input. The diagram comprises a plurality of nodes and a plurality of arcs. Each arc in the plurality of arcs connects one or more of the plurality of nodes. The plurality of nodes comprises a plurality of embedded nodes. Each node in the plurality of nodes belongs to a primary semantic notation, except for the plurality of embedded nodes. Each embedded node in the plurality of embedded nodes includes one or more sub-diagrams belonging to a secondary semantic notation that is not the same as the primary semantic notation. A propagation method is used to propagate TRI through each node in the plurality of nodes based on the semantic notation used by the node. Test-generation templates are determined for each node in the plurality of nodes based on the semantic notation used by the node. Tests are generated for the diagram based on the plurality of test-generation templates.

BRIEF DESCRIPTION OF THE DRAWINGS

Various examples of embodiments are described herein with reference to the following drawings, wherein like numerals denote like entities, in which.

DETAILED DESCRIPTION

Figure 1:
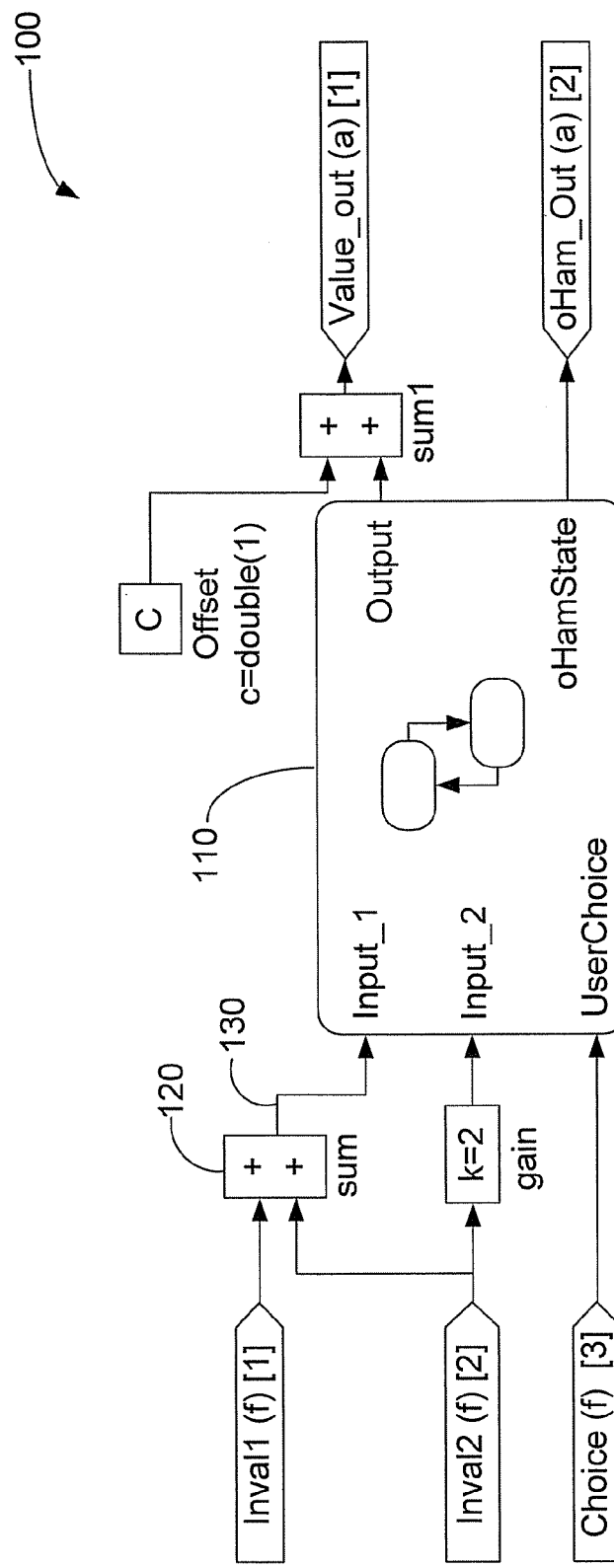
FIG. 1 is an example of a data-flow diagram with a block of the data-flow diagram expressed as a statechart, in accordance with embodiments of the invention.

Methods and apparatus are provided to create comprehensive requirements-based test cases to reduce cost and time of verification, using an approach that takes into account the original semantics of data-flow and statechart notations. The present invention operates on a diagram specifying requirements of the behavior of a system-performing device (e.g., an avionics device, a computer processor, an image processor, and/or a computer software system) that may perform a system function.

The diagram may or may not be a hybrid diagram. If the diagram is not a hybrid diagram, test generation methods may be used to generate tests for the diagram based on the type of semantic notation used to express the diagram. Exemplary methods for generating tests from data-flow diagrams are disclosed in U.S. patent application Ser. No. 11/945,021, entitled "Requirements-Based Test Generation", published on May 29, 2008 as U.S. Pat. App. Pub. No. 2008/0126902 ("the Data-Flow Application") and for generating tests from statecharts are disclosed in U.S. patent application Ser. No. 12/136,146 entitled "Method, Apparatus, and System for Automatic Test Generation from Statecharts" filed on Jun. 10, 2008 ("the Statechart Application"). The entire contents of these two patent applications are incorporated herein by reference. In remainder of this document, unless specifically stated otherwise, the diagram is assumed to be a hybrid diagram.

As stated above, one current approach converts hybrid diagrams into a lower-level notation, such as a program-counter and variable-state notation, and then generate tests using the lower-level notation. This approach has at least three major drawbacks. The first major drawback is that the higher-level semantics of the requirements specified in the hybrid diagram are lost in the lower-level notation, so requirements-based tests cannot be effectively generated. The use of lower-level notation makes it much harder to create test cases, as the overall structure of the higher-level notation, such as data-flow and statechart diagrams, is lost in the details required by lower-level notation.

The second major drawback is much more space is required to store and execute tests generated for a hybrid diagram expressed using a lower-level notation. A transformed diagram expressed in a lower-level notation is much larger and implies orders of magnitude larger state-space than the original data-flow and statechart component diagrams.

The third major drawback is that techniques for solving and state-space pruning based upon the semantics of original statechart and data-flow notations are inapplicable to combination diagrams expressed using a lower-level notation. Loss of semantic information makes it generally more difficult to follow lower-level notation than higher-level notation. The state space, or number of possible states, is much larger for tests expressed using lower-level notation in comparison to tests expressed using higher-level notation. In particular, the state space for tests expressed using program-counter and variable-state notation may be virtually infinite for diagrams with many possible program counter values and a large number of variables, many of which are expressed using types (i.e., integers, strings, and real numbers) that allow huge numbers of possible values. As such, it becomes harder to explore the state space, and consequently much harder, if not impossible, to reason about the equivalence of states in lower-level notation.

A second current approach is to generate random values for the inputs of the diagram and to compute the expected output values through hybrid model simulation. This approach has two major disadvantages. The first disadvantage is that such randomly generated tests are not requirements-based and so cannot reliably uncover functional errors in the implementation of the systems that are specified by hybrid models. The second disadvantage is that the state space explodes as the number of inputs increases for test generation that requires multiple time steps. This makes the random simulation approach not scalable and thus unworkable with real-world models.

The instant application discloses a novel technique that addresses the problems with the current approaches. In particular, a test generation method is provided that combines independent test-generation techniques for hybrid diagrams expressed using multiple higher-level notations, including data-flow diagrams and statecharts. The hybrid test generation method may be implemented by a test generator. The preferred embodiment of the test generator is the Honeywell Integrated Lifecycle Tools and Environment (HiLiTE) computer software package provided by Honeywell International, Inc. of Morristown, N.J.

A device, such as a computing device described with respect to FIG. 3 below, may be used to implement the test generator and/or carry out the blocks of the methods 400, 500, and/or 600 described below. If a computing device is used as the test generator, the methods 400, 500, and/or 600 are implemented as machine language instructions to be stored in data storage of the computing device. Once the tests have been generated, they may be executed by a computerized test driver and/or by human testers.

A hybrid diagram primarily uses one higher-level semantic notation with portions utilizing one or more other higher-level semantic notations. That is, a hybrid diagram expressed primarily using one higher-level semantic model may include one or more "embedded nodes" or components of the primary semantic model expressed in terms of a secondary semantic model that is not the primary semantic model. For example, a parent node or diagram primarily expressed as a data-flow diagram may have one or more embedded nodes expressed in terms of statechart notation, sequence diagrams, and/or other semantic models. Similarly, a diagram primarily expressed as a statechart may have one or more embedded nodes expressed in terms of data-flow notation, sequence diagrams, and/or other semantic models. In particular, an embedded node may include an interface expressed in the primary semantic model as well as one or more sub-diagrams expressed in a secondary semantic model that differs from the primary semantic model. As described herein, as a diagram is defined to be a hybrid diagram, unless otherwise specified, so each diagram contains at least one embedded node.

A node may also be classified as a "designated node" or an "undesignated node" as well. A designated node is a node which has type and range information (TRI) available for use by the test generator, such as for TRI propagation. An example designated node is a sum node of a data-flow diagram, such as node 120 of FIG. 1 described below. Predetermined TRI may be made available to the test generator. For example, TRI for a variety of nodes may be stored in a TRI database that the test generator can access and retrieve TRI, perhaps based on queries to the TRI database, during execution. The TRI database may store test-generation templates as well. If TRI information is not available, then the node may be classified as an undesignated node. An embedded node may also be a designated node if the test generator has TRI information for the embedded node, such as a sum node of a data-flow diagram embedded within a state-chart in which TRI information for the sum node is made available to the test generator.

As such, the test generator must determine the TRI information for each undesignated node. The TRI information for an undesignated node may be determined based on determination of sub-diagrams of the undesignated node. One technique to designate nodes regardless of semantic notation is to treat them as archetypes, as disclosed by U.S. patent application Ser. No. 10/242,201, entitled "Framework for Domain-Independent Archetype Modeling", filed on Sep. 12, 2002, the entire contents of which are incorporated herein by reference.

The concept of a hybrid diagram may be recursive. That is, an embedded node of a hybrid diagram may be expressed primarily using one semantic notation with embedded nodes within the embedded node expressed using a different semantic notation. For an example, suppose a diagram is primarily expressed using statechart notation with an embedded node expressed using data-flow notation. Then, suppose the embedded node, which primarily uses data-flow notation, has an embedded node using statechart notation. This recursive process of embedding nodes within embedded nodes of a hybrid diagram may continue as needed to express the requirements of the diagram.

The test generator may take a diagram as input. For example, the diagram may be expressed as a statechart with embedded nodes expressed as data-flow diagrams or the diagram may be expressed as a data-flow diagram with embedded nodes expressed in statechart notation.

The test generator processes the diagram without reducing the higher-level semantic constructs used in the diagram to lower-level semantic constructs. The test generator accomplishes this by generating test cases or test-generation templates as needed based on the higher-level semantic model used in the diagram. For example, the test generator may generate test-generation templates to fire every transition of a statechart in the diagram and generate test-generation templates to test the requirements of all for data-flow constructs in the diagram. The test generator may use test-generation templates as needed to generate tests for the system-performing device whose requirements are specified by the diagram.

The herein-described test generator uses data-flow notation, statechart notation, and sequence diagram notation as examples of higher-level semantic notations for writing diagrams. Other higher-level semantic notations may be used as well, as long as the higher-level semantic notation meets three requirements.

The first requirement is that the higher-level semantic notation permits the generation of test-generation template(s) for the node. A test-generation template describes functional requirements of the node, including a time sequence of values to be applied as inputs to the node and expected outputs from the node. The test-generation template may include test cases, or specific input and output values, from the node.

The second requirement of the higher-level semantic notation is that TRI for nodes of the diagram can be generated for a diagram using the higher-level semantic notation to constrain any generated test-generation templates. In other words, the higher-level semantic notation must permit test generation that takes variable type (e.g., integer, string) and value and/or range information (e.g., specific values like "a" or 7.2 and/or ranges of values like [a-z] or [1-10]) into account.

The third requirement is that it must be possible to determine a query for each node of the diagram written in the higher-level semantic notation to propagate values downstream to measurable observation points. The query must be able to specify inputs that could be applied to the node and return possible outputs from the node, in order to attribute values to the node. The query must also be able to project values up-stream through the node to affectable input points. The query must be able to specify outputs that could be generated from the node and return possible inputs to the node, in order to determine test-generation templates and/or test cases for the node.

An automated testing system, such as a test driver or test harness, may use these test vectors to verify the requirements embodied in the statechart. The requirements may be verified by the test driver testing the system-performing device. Because application developers currently use costly inspection procedures and manual test generation to meet industry-standard development objectives, such as the DO-178B standard in the aircraft industry, this automation of the process can dramatically reduce the time and resources needed for verification. Alternatively, human readable tests may be generated from the test vectors and human testers may test the system-performing device.

The flexibility allowed by mixing and matching semantic models in a single diagram permits test generation for systems specified with any combination of statecharts, data-flow diagrams, and/or other higher-level semantic models, allowing system designers and requirements writers to use multiple higher-level semantic models as required by the project. Also, while hybrid diagrams are expressed as using multiple higher-level semantic models, it is possible that the diagram and/or embedded nodes within the diagram may be expressed using lower-level semantic notation.

An Example Data Flow Diagram

A diagram may be primarily expressed using data-flow notation. FIG. 1 is an example data-flow diagram 100 with a block 110 of the data-flow diagram expressed as a statechart (i.e., an embedded node), in accordance with embodiments of the invention. The data-flow diagram 100 consists of blocks 110, 120 that are interconnected by directed arcs, such as the arc 130, which provide data flow between blocks. A block of the data-flow diagram 100 may be a mathematical operator (e.g., a sum or a product) or an embedded node, such as a block expressed using statechart notation. For example, the block 120 is a sum operator and the block 110 is an embedded node expressed as a statechart in the data-flow diagram 100. As such, the block 110 may comprise one or more states.

Further, one or more states in the statechart of block 110 may be embedded nodes expressed using a higher-level notation other than statechart notation within the statechart of block 110, and so on.

An Example Statechart

Figure 2:
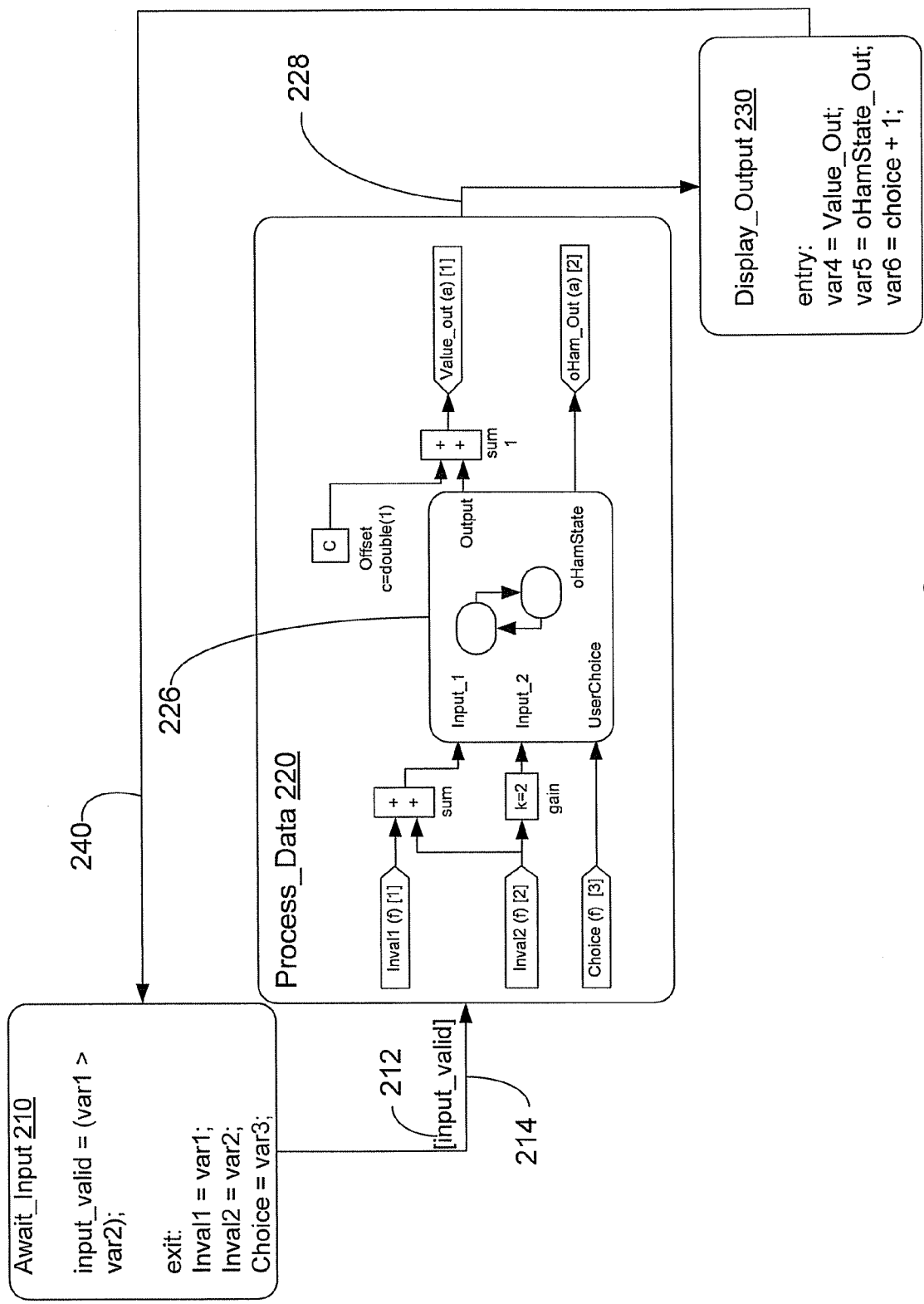
FIG. 2 is an example statechart diagram with a state of the statechart expressed as a data-flow diagram, in accordance with embodiments of the invention.

A diagram may be primarily expressed using statechart notation. FIG. 2 is an example statechart diagram 200 with states 210, 220, and 230, in accordance with embodiments of the invention. In particular, state 220 of the statechart comprises an internal data-flow diagram.

An "up-stream state" is a state reached before a current state in traversing the conditions of the state chart. Similarly, a "down-stream" state is a state reached after a current state. In visual terms, an up-stream state is at the blunt end of an arrow representing transition(s) to a down-stream state and the down-stream state is at the pointed end of that same arrow. For example, if the current state is state 220, state 210 is up-stream from state 220 (via transition 214) and state 230 is down-stream of state 220 (via transition 228).

Note that in semantic notations that contain cycles, such as statechart and data flow notations, some nodes may be both up-stream and down-stream. For example, state 210 is downstream of state 220 via a path including transition 228, state 230, and transition 240 and state 230 is upstream of state 220 via a path including transition 240, state 210, and transition 214.

A transition may have a condition that must be satisfied before the transition can be traversed, such as condition 212 that "guards" transition 214.

In FIG. 2, local variables of the statechart diagram 200 map to the input and output ports of the embedded data-flow diagram. FIG. 2 shows state 210 with eleven local variables: "Inval1", "Inval2", "Value Out", "oHam_Out", "Choice", "var1", "var2", "var3", "var4", "var5", and "var6". Local variables may be used by up-stream or down-stream states expressed either as statechart states or embedded nodes. FIG. 2 shows state 220 expressed as a data-flow diagram using variables "Inval1", "Inval2" and "Choice" as input ports, which are assigned values in up-stream state 210.

FIG. 2 shows state 220 with output ports "Value_out" and "oHam_Out". These output ports are read in state 230 that is down-stream of state 220 when state 230 is reached via transition 228.

Further, one or more blocks in the data-flow diagram of state 220 may be embedded nodes expressed using a higher-level notation other than data-flow notation within the data-flow diagram of state 220, and so on. FIG. 2 shows that block 226 comprises a statechart diagram and as such, block 226 in an embedded node of the data-flow diagram of state 220.

Signal Attribution

Specific requirements may be made on down-stream node. A down-stream node may require one or more inputs generated as outputs of another node to verify that the one or more propagated input values have proper "attribution". Attribution is the ability to trace a signal, such as an input or output value, along a path through a diagram. Attribution may be required to meet customer and/or governmental requirements, such as the DO-178B Software Considerations in Airborne Systems and Equipment Certification used by the Federal Aviation Administration (FAA) for verifying software in avionics.

To attribute a specific down-stream input for a down-stream node, a specific test case may be generated for an up-stream node that produces a specific up-stream output that subsequently leads to the specific down-stream input. For example, suppose there are only two states in a statechart—UpStream state and DownStream state where UpStream state is up-stream of DownStream state. Suppose the value of a variable j needs attribution, but the value of j is only set in DownStream state. Further, suppose the transition from UpStream state to DownStream state has a guard of "i>3". Thus, the specific down-stream input for DownStream state is the condition where the variable i is greater than three. In this case, the test generator may determine that a test case for UpStream state must be generated with particular input values so that i>3.

The test generator may query a plurality of test cases generated for an embedded node to determine if one or more test cases generate the specific up-stream output. If the query succeeds, the specific up-stream output that leads to the specific down-stream input can be generated and thus the specific down-stream input is attributable from the up-stream node. If the query fails, the specific down-stream input may not be attributable to from the up-stream node that generates the specific up-stream input to the down-stream node.

To attribute a specific output for an up-stream block, the up-stream block may determine that a specific test case needs to be generated with a specific down-stream input from the output of an embedded node. The test generator may query a plurality of test cases generated for the embedded node to determine if one or more test cases generate the specific down-stream input. If the query succeeds, the specific up-stream output may be attributed to the one or more test cases that generate the specific down-stream input. If the query fails, the specific up-stream output may be not attributed through the down-stream node.

For example, the specific up-stream output may be one of many inputs to one or more nodes that ultimately lead to the specific down-stream input and as such, the specific down-stream input of the embedded node may or may not be attributable to the specific up-stream output.

To illustrate, suppose a statechart has four states: State1, which reads the value of "in1" and writes to output "out1"; State2, which reads the value of "in2" as an input and writes to output "out2"; MergeState, which reads both the values of "out1" and "out2" and writes to and writes to output "merge_out"; and DownstreamState, which reads the value of "merge_out" and writes to output "downstream_out". Further suppose that a specific value (or values) of "merge_out" are to be attributed from State1 to DownstreamState. As State1 only generates outputs for "out1" alone, the specified value (or values) of "out1" may or may not lead to a specific value of "merge_out" depending on the use of "out2" in state MergeState. Thus, it may be impossible to determine if a specific value of an up-stream output (e.g., "out1") is attributable to a specific down-stream input (e.g., "merge_out"), and thus the value of the specific down-stream input and subsequent down-stream values (e.g., "downstream_out") may or may not be attributable along a path through the diagram.

An Example Computing Device

Figure 3:
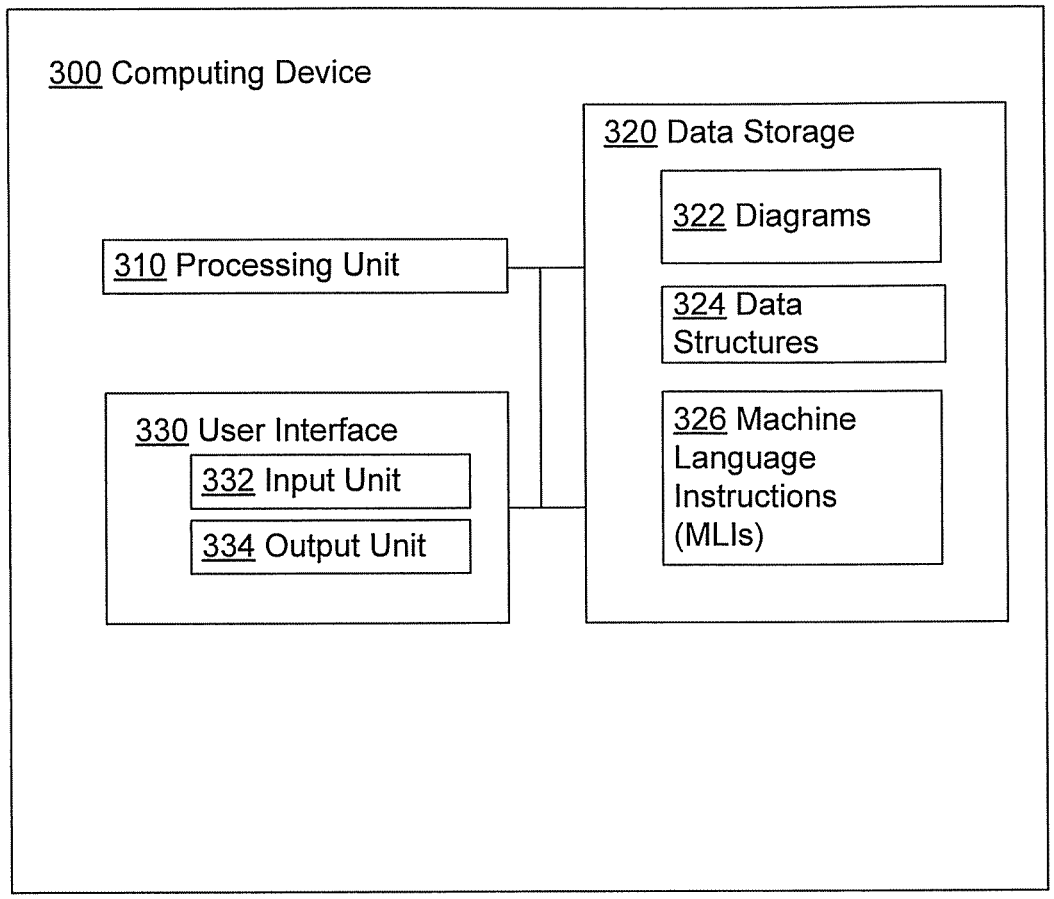
FIG. 3 is an example of a computing device, in accordance with embodiments of the invention.

FIG. 3 is a block diagram of an example computing device 300, comprising a processing unit 310, data storage 320, and a user interface 330, in accordance with embodiments of the invention. A computing device 300 may be a desktop computer, laptop or notebook computer, personal data assistant (PDA), mobile phone, or any similar device that is equipped with a processing unit capable of executing computer instructions that implement at least part of the herein-described method 300 and/or herein-described functionality of a test generator and/or a test driver.

The processing unit 310 may include one or more central processing units computer processors, mobile processors, application specific integrated circuits (ASICs), digital signal processors (DSPs), microprocessors, computer chips, specialized logic circuitry and/or similar processing units executing instructions either serially or in parallel, now known and later developed and may execute machine-language instructions and process data.

The data storage 320 may comprise one or more storage devices. The data storage 320 may include read-only memory (ROM), random access memory (RAM), removable-disk-drive memory, hard-disk memory, magnetic-tape memory, flash memory, and similar storage devices now known and later developed. The data storage 320 comprises at least enough storage capacity to contain one or more diagrams 322, data structures 324, and machine-language instructions 326.

Data structures 324 comprise any data structures described herein required to perform some or all of the functions of a herein-described test generator, a herein-described test driver, and/or to perform some or all of the procedures described in methods 400, 500, and/or 600, including, but not limited to, a TRI data structure(s) and TRI-propagation queue(s). The machine-language instructions 326 contained in the data storage 320 include instructions executable by the processing unit 310 to perform some or all of the functions of a herein-described test generator, a herein-described test driver and/or to perform some or all of the herein-described procedures of methods 400, 500, and/or 600.

The user interface 330 may comprise an input unit 332 and/or an output unit 334. The input unit 332 may receive user input from a user of the computing device 330. The input unit 332 may comprise a keyboard, a keypad, a touch screen, a computer mouse, a track ball, a joystick, and/or other similar devices, now known or later developed, capable of receiving user input from a user of computing device 300. The output unit 334 may provide output to a user of the computing device 330. The output unit 334 may comprise one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 300. The output unit 334 may alternately or additionally comprise one or more aural output devices, such as a speaker, speaker jack, audio output port, audio output device, earphones, and/or other similar devices, now known or later developed, capable of conveying sound and/or audible information to a user of computing device 300.

As such, the computing unit 300 is representative of exemplary means of implementing and carrying out the various functions, steps, and procedures described herein.

An Example Method for Generating Tests from Hybrid Diagrams

Figure 4:
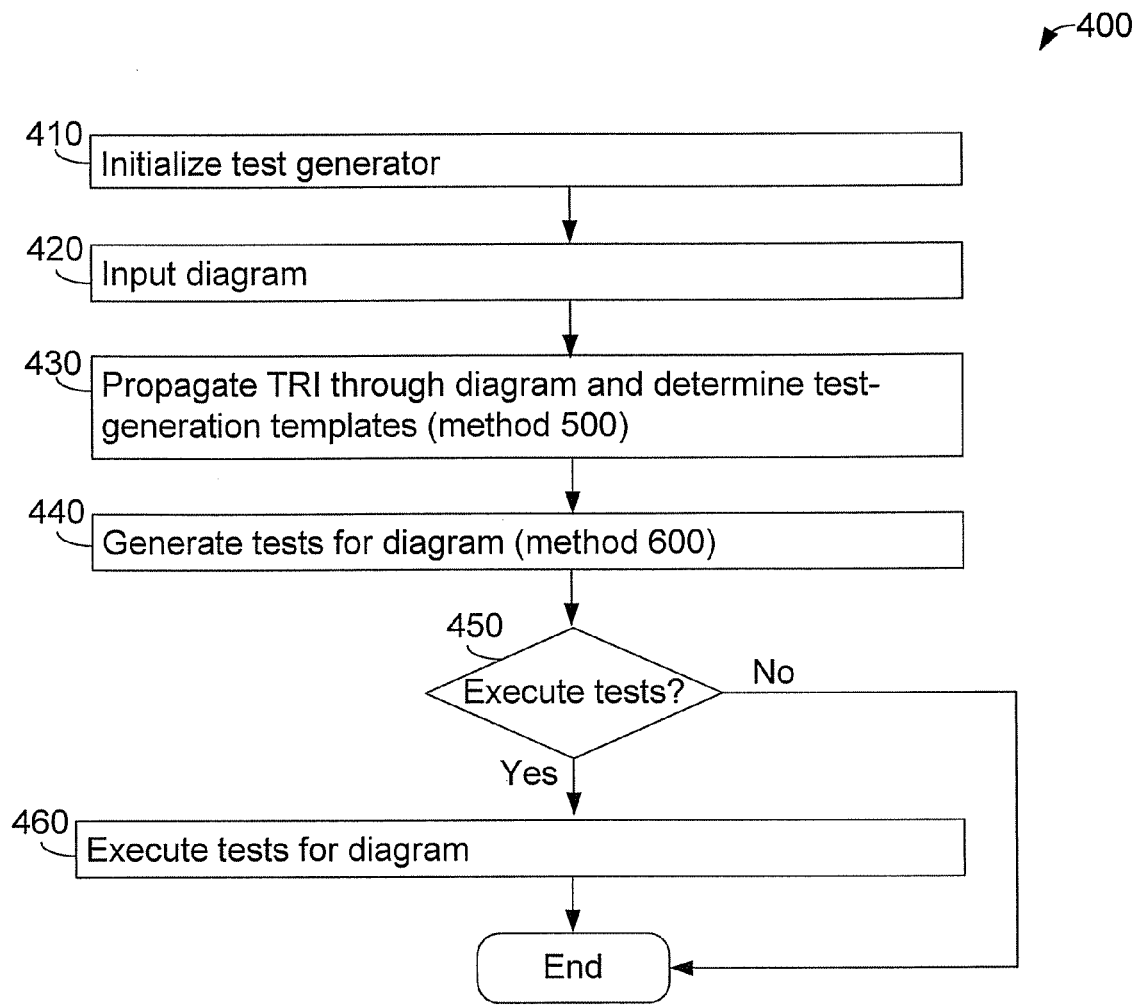
FIG. 4 is a flowchart depicting an example method for generating tests from a diagram, in accordance with embodiments of the invention.

FIG. 4 is a flowchart depicting an example method 400 for generating tests from a diagram, in accordance with embodiments of the invention.

It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 400 begins at block 410. At block 410, a test generator is initialized. Initializing the test generator may comprise initializing data structures used by the test generator to execute the blocks of methods 400, 500, and/or 600, including but not limited to a TRI-propagation queue and/or a plurality of test-generation templates. Methods 500 and 600 are described below with respect to FIGS. 5 and 6, respectively.

At block 420, the test generator inputs a diagram. The diagram may represent requirements for a system-performing device such as an avionics device, a computer processor, an image processor, a computer software system, or other such device.

The diagram may comprise a set of nodes and a set of arcs connecting one or more nodes within the set of nodes. The diagram may be expressed in a first higher-level semantic notation. The diagram may be a hybrid diagram. If the diagram is a hybrid diagram, at least one node in the set of nodes is an embedded node; that is, a node that has at least one sub-diagram expressed in a higher-level semantic notation other than the first higher-level semantic notation. The diagram may be expressed textually and/or pictorially.

At block 430, the test generator may propagate TRI, perhaps stored in a TRI data structure, through the diagram. Also at block 430, the test generator may determine test-generation templates and also (or instead) determine test cases. A test-generation template for a node describes a specific functional requirement of the node consisting of a time sequence of inputs to the node and expected outputs from the node. A test case contains vectors of values and/or ranges of values based on the inputs and outputs of the diagram. The TRI may be propagated and the test-generation templates determined using the procedures of method 500, described below with respect to FIG. 5.

The TRI may be propagated using information, such as the TRI data structure, about the variables used in the diagram. For some nodes, no data TRI may be propagated or test-generation templates generated; for example, an unreachable state in a statechart diagram may not have any relevant TRI or feasible test-generation templates. The TRI may include range information that may be used to bound values of particular variables. For example, the TRI for the Inval1 variable of FIG. 1 may indicate a range of [0, 1000] and the TRI for the Inval2 variable may be used to indicate a range of [0, 2000]. Also, type information may be specified as part of TRI as well; e.g., Inval1 is an integer-typed value.

The test generator may then propagate TRI throughout the diagram, perhaps by performing the operations specified by the diagram. Continuing with the example above, as the TRI for Inval1 indicates a range of [0, 1000] and the TRI for the Inval2 indicates a range of [0, 2000], the TRI for the sum variable at node 120 of FIG. 1 indicates a range of the sum of the ranges of Inval1 and Inval2, or [0,3000].

Specific values, ranges of values, and relative values may be specified and then propagated through the diagram. As another example, suppose that the Inval1 variable of FIG. 1 was specified to have a value of 2.2, the Inval2 variable was specified to be in the range [0,2000], and that the Choice variable was specified to be less than Inval1. Then, the value propagated to the sum variable (and perhaps to the Input_1 variable) may be the sum of Inval1 and Inval2, e.g., the range [2.2, 2002.2]. Further, the range of the Choice variable would be (−∞, 2.2).

The TRI for each selected node may be determined using the static analysis and/or dynamic analysis procedures described with respect to FIGS. 3 and 4 of the Data-Flow Application. In particular, TRI may be based on information provided by a developer or other author(s) of the diagram. The TRI may be provided for any variables, inputs, and/or outputs of the diagram. The test generator may determine there are static errors in the diagram as part of static analysis and may permit the developer/author to correct the static errors. Also, automated type and/or range techniques may be used to determine TRI as well, such as parsing of computer-program files and/or files containing the diagram for variable type and/or range information. Example computer-program files are data specification files for computer languages (e.g., C or C++ header files) or Unified Modeling Language (UML) static structure diagrams, such as class diagrams, component diagrams, composite structure diagrams, deployment diagrams, object diagrams, and package diagrams.

The test-generation templates may be determined based on the functional requirements, internal structure, internal semantics of the node (perhaps combined with the propagated TRI), as well as additional information, such as system inputs. The test generator may analyze the diagram to determine the TRI for each node of the diagram, including nodes within embedded nodes of the diagram.

Using the example of the data-flow diagram 100 shown in FIG. 1, test-generation templates may be determined based on specific value(s) of Inval1, Inval2, and/or Choice (i.e., the inputs to the data-flow diagram 100). TRI may be determined based on specific values of other nodes, such as values of Input_1 required as inputs to block 110 (and perhaps downstream nodes of block 110), as shown in FIG. 1.

Again using the example of the data-flow diagram 100 shown in FIG. 1, suppose that Inval1 was specified to be 2.2 and Inval2 was specified to be 3.3, based on system inputs separate from TRI. Then, the test generator could then generate a test-generation template that constrains the output variable of block 120 to be 5.5, based on the system inputs for Inval1 and Inval2. Further, the test generator could then generate test-generation template(s) for statechart 110 of FIG. 1 that constrains Input_1 to be equal to the value of the sum variable or 5.5.

The propagated TRI may be applied to constrain test vectors. A test vector for a given node indicates the value(s) of input and output variables for the given node. Also, a test vector may be generated that indicates input and output variables for a group of nodes, including for the diagram as a whole. The test vector for a given node may be stored with test-generation template(s) for the given node and/or be used to modify test-generation templates for the given node and/or other nodes in the diagram.

At block 440, the test generator generates tests for the diagram. The test generator may generate the tests based on the constraints propagated through the diagram. In particular, the test generator may use the TRI data structure, test cases, test vectors and/or test-generation templates described above to indicate propagated value constraints. The propagated values may be used to generate tests for the diagram. Tests may be generated to test all nodes in the diagram and/or to test one or more given nodes in the diagram (e.g., perform sub-unit testing). To generate the tests, the test generator may use the procedures of method 600 described below with respect to FIG. 6.

At block 450, a determination is made as to whether or not the generated tests are to be executed. This determination may be based on user input, may be hardcoded, and/or may be determined based on the presence (or absence) of hardware and/or software (e.g., tests are not executed unless a testing device, such as a test harness, is active). If the tests are to be executed, method 400 may proceed to block 460. If the tests are not to be executed, method 400 may end.

At block 460, the generated tests may be executed. One or more generated tests may be selected to be executed; as such, not all tests have to be executed either upon generation or at one time. The tests may be selected based on selection of specific nodes and/or (sub-)diagram(s) of interest. The selections may be made based selection of specific tests, nodes, sub-diagrams, or diagrams, perhaps via user input. The selections may instead or in addition, be based on a test-execution status for one or more tests again perhaps via user input. For example, tests may have a test-execution status of "passed" for tests that have been executed successfully, "failed" for tests that have not been executed successfully, "not yet run" for unexecuted tests, and/or "requires more study" for tests that require further consideration before the test-execution status is determined. Tests may be selected whose test-execution status has one or more specific values (e.g., select all tests whose test-execution status is "failed" or "not yet run"). Tests may also be selected based on the availability of specific software and/or hardware units; e.g., for example, run all tests affected by the availability of the "AutoPilot" software unit or the "Engine 3" hardware unit. Many other selections may be made as well.

The selected tests may be executed automatically, such as by passing the selected tests to a test driver. The selected tests may be executed manually by a human tester. If manual testing is performed, the selected tests may be formatted to be output in a human-readable format to permit easier test execution. After completing block 460, method 400 ends.

In particular, method 400 may be used to generate test cases and execute tests for embedded nodes. For example, suppose the diagram is primarily written using data-flow semantics and includes an embedded node expressed using statechart notation. Further suppose that the embedded node expressed using statechart notation comprises a state represented as an embedded data-flow diagram (i.e., a data-flow diagram embedded in a statechart embedded in a data-flow diagram). Then, the procedures of method 500 described in detail below with respect to FIG. 5, may be used to propagate TRI information and determine test-generation templates for all nodes of the diagram including embedded nodes and embedded nodes in embedded nodes and so on. The procedures of method 600 may be used to then generate tests based on the test-generation templates and TRI.

Figure 5:
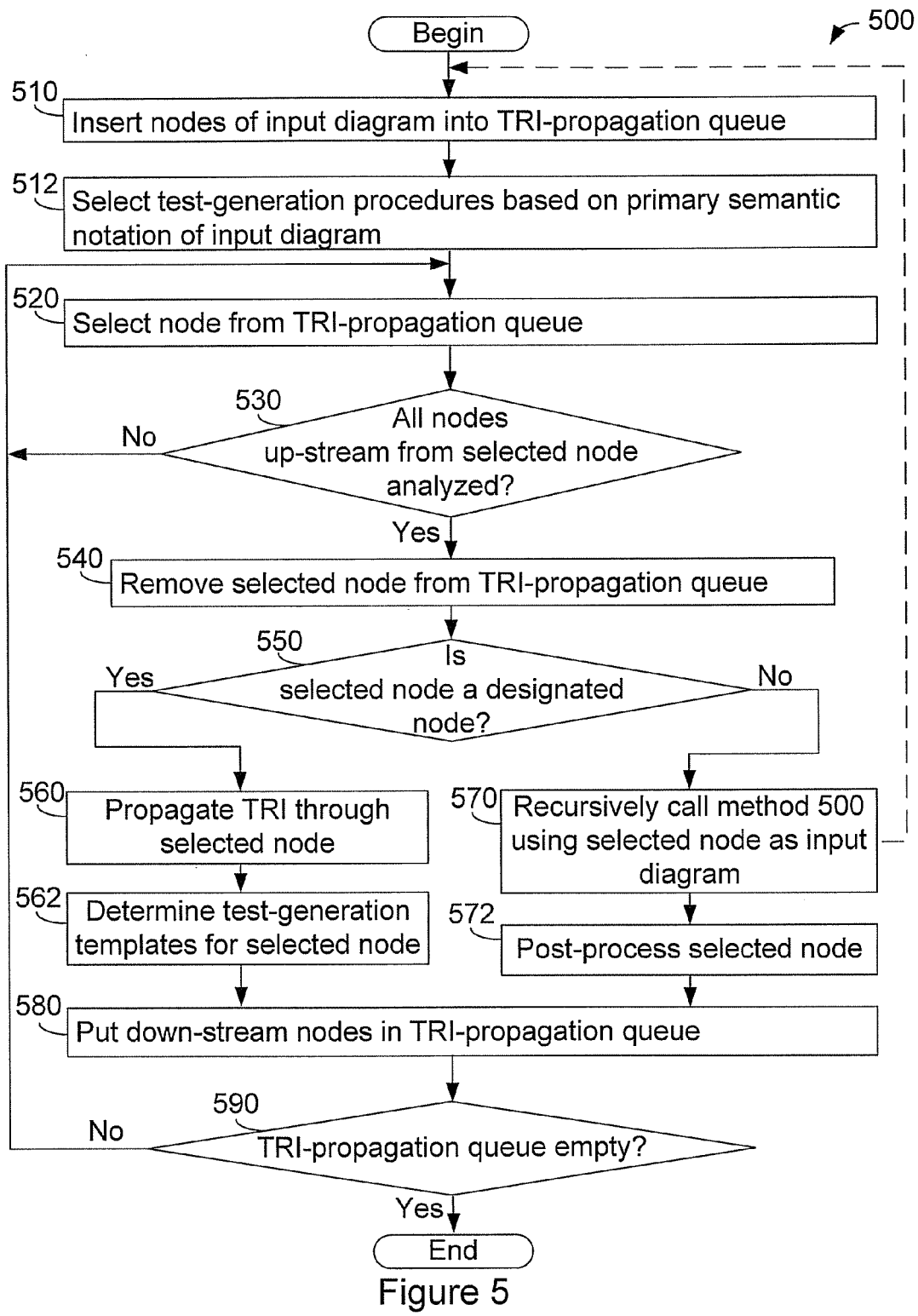
FIG. 5 is a flowchart depicting an example propagation method for propagating TRI through a diagram and determining test-generation templates, in accordance with embodiments of the invention.

An Example Method for Propagating TRI Through a Diagram and Determining Test Generation Templates FIG. 5 is a flowchart depicting an example propagation method 500 for propagating TRI through a diagram and determining test generation templates, in accordance with embodiments of the invention. Method 500 may be executed by a test generator, such as a herein-described test generator. Note that method 500 may be termed as a propagation method.

Method 500 begins at block 510. At block 510, the test generator inserts nodes of an input diagram into a TRI-propagation queue. Example input diagrams are the diagram, a parent diagram that is not the diagram, or a single node. While the term "TRI-propagation queue" is used herein, the implementation of a TRI-propagation queue may involve use of one or more data structures, such as but not limited to, a queue, a stack, a list, a hash table, a tree, one or more database structures (e.g., database tables), a priority queue, or other data structure suitable to act as a herein-described TRI-propagation queue.

At block 512, the test generator may determine a primary semantic notation of the input diagram. Based on the determined semantic notation, the test generator may select one of a group of test-generation procedures (e.g., test-generation procedures based on data-flow notation, statechart notation, sequence diagram notation, and so on) may be selected for the input diagram. Such test-generation procedures may include procedures for propagating TRI, determining test-generation templates, and/or post-processing nodes. Other test-generation procedures that are based on the primary semantic notation are possible as well.

At block 520, the test generator selects a node from the TRI-propagation queue.

At block 530, the test generator determines if all nodes up-stream from the selected node have been analyzed. The test generator may examine the TRI-propagation queue to determine if a node up-stream from the selected node is in the TRI-propagation queue. The test generator may determine that all nodes up-stream from the selected node have not been processed if the test generator finds a node up-stream from the selected node in the TRI-propagation queue.

If all nodes up-stream from the selected node have been processed, the test generator proceeds to block 540. If all nodes up-stream from the selected node have not been processed, the test generator proceeds to block 520. Note that the test generator may use order the analysis of the nodes using a different criterion than ensuring all nodes up-stream from the selected node have been processed, such as ensuring all nodes up-stream from the selected node have been processed.

At block 540, the test generator removes the selected node from the TRI-propagation queue.

At block 550, the test generator determines if the selected node is a designated node. As previously defined, a designated node is a node which has TRI available for use by the test generator. The test generator may determine if the selected node is a designated node by searching for and finding TRI and/or test-generation templates, perhaps in a TRI database, for the selected node.

The test generator may, instead or in addition to determining the node is a designated node, determine if the selected node is an embedded node. The test generator may determine that the selected node is an embedded node by determining that the selected node has an internal diagram (sub-diagram) that does not use the primary semantic notation.

The test generator may search for TRI and/or test-generation templates, including but not limited to pre-determined TRI, for the embedded node before determining that the embedded node is a designated node. Alternatively, the test generator may make a default determination that an embedded node is an undesignated node, under the assumption that TRI is unavailable for nodes using a semantic notation other than the primary semantic notation.

If the node is a designated node, then the test generator proceeds to block 560. If the node is an undesignated node, then the test generator proceeds to block 570.

At block 560, the test generator propagates TRI through the selected, designated node; that is, the test generator determines TRI for variables used in the selected node, based on the semantic notation for the selected node, any additional information available for the node (e.g., information in a node-designation data structure for the node), and the TRI generated by the up-stream nodes (if any) of the selected node, perhaps represented in the TRI data structure for the selected node. In particular, the test generator may use a test-generation procedure selected based on the primary semantic notation of the input diagram to propagate the TRI. The TRI data structure for each node in the input diagram may be stored in the TRI-propagation queue.

At block 562, the test generator determines one or more test-generation templates for the selected designated node. The test-generation templates may be determined based the semantic notation of the selected node and the propagated TRI information for the selected node. In particular, the test generator may use a test-generation procedure selected based on the primary semantic notation of the input diagram to determine test-generation templates.

For example, suppose test cases have been generated, perhaps during a completed recursive call of generation method 500, for a statechart block embedded within a diagram written primarily in data-flow notation. Each diagram-level test case generated for the embedded diagram, represented by a statechart, may be considered as a test-generation template for a block of the data-flow diagram represented by the statechart. As such, the generated test cases for the statechart may be used to determine test-generation templates for the parent data-flow diagram. In addition, a test case may be reformatted or otherwise processed to determine a corresponding test-generation template.

The test generator may determine constraints on the time sequence of inputs and expected output values for a test case or test-generation template for a given node using (i) the TRI data structure and/or other data about the given node and/or (ii) the TRI data structure(s) data from other relevant nodes in the diagram. The other relevant nodes may be nodes upstream from the given node.

In particular, the test generator may update any "reachable" nodes down-stream of the selected node based on the TRI data structure for the selected node. The test generator may determine that the node is reachable based on the TRI information of the selected node, the TRI information of the down-stream node, and/or the input diagram. For example, the determination that the Process_Data state 220 of FIG. 2 is reachable from the Await_Input state 210 depends on the value of an input_valid variable as indicated by condition 212. As shown in Await_Input state 210, the value of input_valid depends on the values of inputs var1 and var2. Then, if the TRI indicates that the range of var1 is constrained to [0, 10] and the range of var2 is [100, 200], then the test generator may determine that Process_Data state 220 is unreachable.

The test generator may update the TRI data structure for reachable down-stream nodes based on information about operations performed by the selected node. For example, suppose the test generator determines that the selected node performs the following operation: "i=100". Then, the test generator may update the TRI data structure of each down-stream node from the selected node to indicate that the variable i is set to 100. As such, determination of a given test-generation template is based on the semantic notation of the selected node, since the semantic notation of the selected node determines operations that may be modeled by the semantic notation and effects of those operations.

Note that the test generator may first determine if down-stream nodes are reachable as well as the order in which nodes along a path to the down-stream node(s) are reached before updating the TRI data structures of down-stream nodes (i.e., the only TRI data structures updated may be the TRI data structures of down-stream nodes reachable from the selected node).

A test generation algorithm, applied to a down-stream node, may use the TRI data structure to indicate initial conditions upon entry of the down-stream node. Continuing the previous example, one initial condition (stored in the propagated-information data structure of a down-stream node of the selected node) may be that "i=100". As this condition is an initial condition to the node it may be determined to occur at an earlier timestep than the timestep where the functionality of the down-stream node is invoked.

The test generator may perform dynamic analysis as well, by indicating timing information to each node. For example, suppose the variable i is unspecified for 10 timesteps and then is specified to be 100 as indicated above for 20 subsequent timesteps and then specified to be 0 thereafter. Then, the test generator may indicate to the selected node and/or to reachable down-stream nodes that the variable i has the time-dependent values of: "unspecified" for timesteps 0-10, 100 for timesteps 11-30, and 0 after timestep 30.

Note that the procedures of both blocks 560 and 562 may be done at the same time. In other words, TRI may be propagated and a test-generation template determined for the selected node simultaneously, either by combining software implementing blocks 560 and 562 into one combined module, by use of a combined static-dynamic analysis technique, or by other means.

After completing the procedures of block 562, the test generator may proceed to block 580.

At block 570, the test generator recursively calls the propagation method 500 using the embedded node as the input diagram. The recursive call to the propagation method 500 is shown in FIG. 5 as the dashed arrow proceeding from block 570 that touches the arrow descending toward block 510. The recursive call to the propagation method 500 may be implemented using a function call that takes a diagram as an input.

For example, suppose method500(in_diagram, output) is a function implementing the techniques of method 500, where in_diagram is a diagram input to method500( ) and output is an example data structure representing the output of method500( ). Further suppose a diagram, such as in_diagram supports a software method or function that returns a data structure representing the diagram called getDiagram( ). That is, the invocation of in_diagram.getDiagram( ) returns a data structure representing the diagram in_diagram. Then if embedded_node represents the selected node that is determined to be an embedded node in block 540, an recursive call to method 500 may be method500(embedded_node.getDiagram( ), output). If an embedded node embedded_node2 is found while the recursive call to method 500 is executing, then method 500 may be called recursively again; e.g., method500(embedded_node2.getDiagram( ), output). In this fashion, embedded nodes within a hybrid diagram may be processed to a depth limited only by the hardware and software resources of the computer executing method 500.

In general, the determination made at block 550 provides for selection of readying test-generation templates based on the availability of TRI, which may in turn be based on the primary semantic notation of the input diagram and whether or not the node is designated. If the node is a designated node, performing the procedures of blocks 560 and 562 propagate TRI and ready the test-generation templates via procedures that may be specific to the primary semantic notation of the diagram and the type of the node. However if the node is an undesignated node, the recursive call at block 570 permits selection of different procedures based on the primary semantic notation of the undesignated node, which may differ from the primary semantic notation of the input diagram, as the undesignated node is treated as the input diagram during the recursive call.

For example, suppose an undesignated node is an embedded node with an internal diagram written using statechart information and embedded in a diagram primarily written using data-flow notation. Method 500 treats the undesignated embedded node as if the internal diagram of the embedded node were an isolated statechart. As such, the test generation techniques for statecharts described in the Statechart Application may be used to project inputs and outputs through the embedded node. In particular, test cases may be generated using the forward-propagation pass and/or backward-propagation pass techniques for statecharts. The forward-propagation pass and the backward-propagation pass operate on statecharts, and as such, generate tests from requirements specified in statechart notation. The test cases contain values of statechart inputs to be applied and expected outputs over multiple time steps (periodic or event driven). For statechart level test generation, statechart notation semantics are used for all states (including embedded data-flow diagrams), using the statechart techniques described in the Statechart Application. Once generated, each test case may be processed or reformatted for use as TRI and/or test-generation templates, perhaps by generating a test-generation template corresponding to the test case or by updating an existing test-generation template based on the test case.

When the recursive call completes, method 500 may proceed to block 572.

At block 572, the test generator may post-process the selected node. The post-processing may include combining and/or projecting TRI from node(s) reached during the recursive call of the generation method 500 to node(s) of the input diagram not reached during the recursive call. The test generator may use a test-generation procedure selected based on the primary semantic notation of the selected node to post-process the selected node.

The combination and/or projecting of TRI from the nodes reached during the recursive call to the nodes of the input diagram may be based on the primary semantic notation(s) of the input diagram and/or the reached nodes reached during the recursive call. In particular, the combination and/or projection of TRI may depend on an analysis of the nodes reached during the recursive call and/or those of the input diagram.

For one analysis example, type conversions may be required based on the semantic notations of the respective nodes. As another analysis example, suppose a "vector-op" node reached during the recursive call performs a vector operation supported by the semantic notation of the vector-op node before producing an output to a "vector-out" node in the input diagram. Then, the TRI provided to the vector-out node depends on the semantic notation of the vector-op node.

Further, as part of the procedures of block 572, the output of the post-processing may need to be made available to node(s) of the input diagram. This output may be made available by projecting TRI information, perhaps using the propagation techniques described with respect to block 560 and/or the determination techniques described with respect to block 562. To make the post-processing output available, the test generator may instead or in addition use forward-propagation of inputs from the input diagram to and through the nodes reached during the recursive call and/or backward-propagation of outputs to and through the nodes reached during the recursive call.

After completing the procedures of block 572, the test generator may proceed to block 580.

At block 580, the test generator may put nodes that are down-stream from the selected node into the TRI-propagation queue. The test generator may first examine the TRI-propagation queue for the presence of each down-stream node before putting the down-stream node into the TRI-propagation queue.

At block 590, the test generator may determine if the TRI-propagation queue is empty. If the TRI-propagation queue is not empty, the test generator may proceed to block 520. If the TRI-propagation queue is empty, method 500 may end. However, if the data-propagation call was initially filled during a recursive call to method 500, the recursive call to method 500 may complete upon determination of that the TRI-propagation queue is empty at block 590, and the method 500 may continue until both (a) all recursive calls to method 500 have completed and (b) the TRI-propagation queue is empty.

Method for Generating Tests from a Diagram

Figure 6:
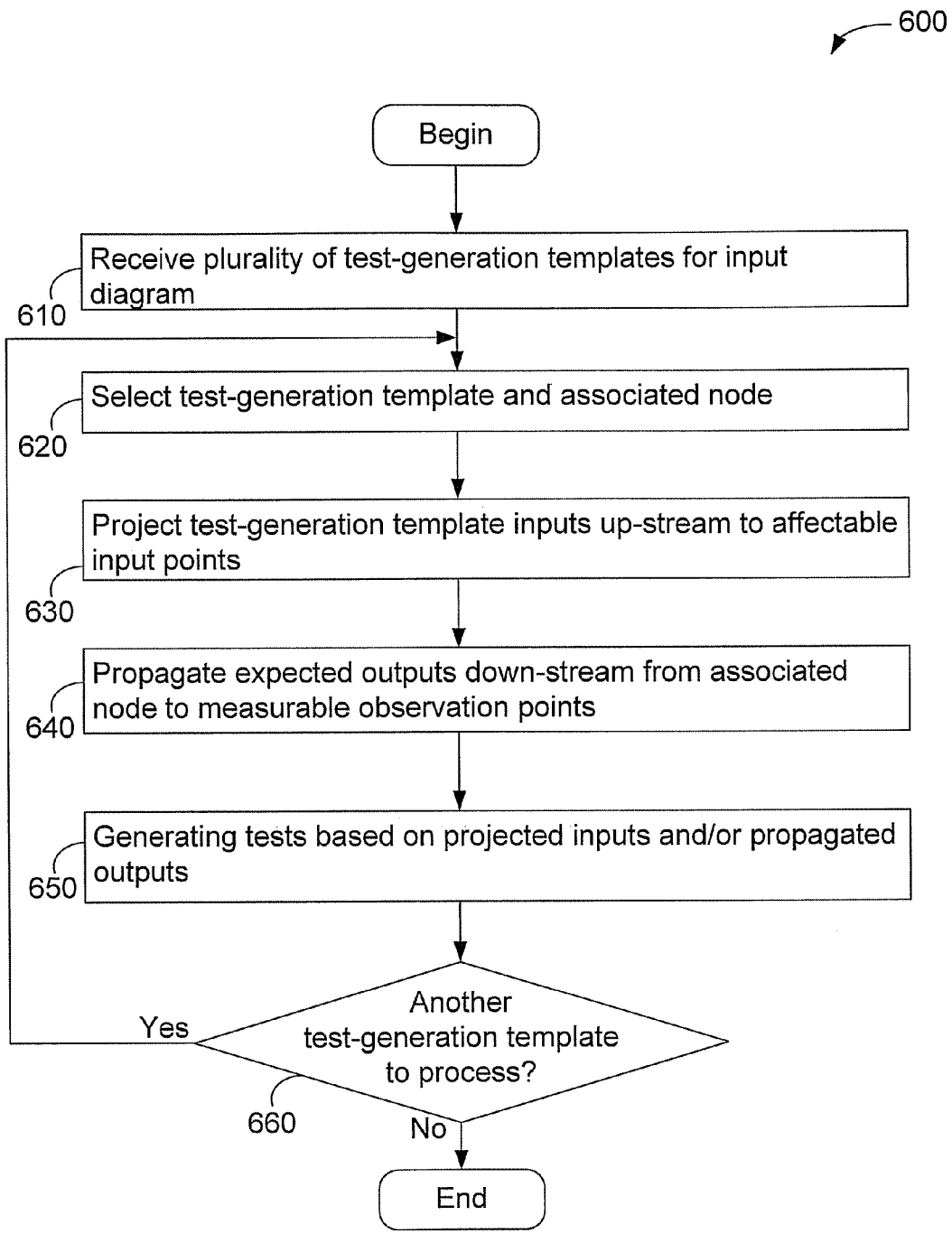
FIG. 6 is a flowchart showing an example method for generating tests from test-generation templates, in accordance with embodiments of the invention.

FIG. 6 is a flowchart showing an example method 600 for generating tests from test-generation templates, in accordance with embodiments of the invention.

Method 600 begins at block 610. Method 600 may be executed by a test generator.

At block 610, the test generator receives a plurality of test-generation templates associated with the diagram. The received test generation-templates may generated by use of method 500, described above with reference to FIG. 5. The received test-generation templates may be stored in a test-generation-template data structure.

At block 620, the test generator selects a test-generation template. The test-generation template may be associated with a particular node of the diagram. The test-generation-template data structure may be updated as well, based on the selection. For example, the selected test-generation template may be removed from the test-generation-template data structure and/or the selected test-generation template may be marked as "selected" in the test-generation-template data structure. Many other techniques for selecting a test-generation template are possible as well.

At block 630, the test generator projects inputs up-stream to affectable input points. The test generator may project the inputs up-stream by updating the values specified by the test-generation template(s) for node(s) that are along a path up-stream of the associated node to one or more affectable input points based on inputs to be projected. The test generator may stop projecting inputs once it reaches the affectable input points. If the diagram that contains the node has a parent diagram and an affectable input point is not reachable in the child diagram, the value(s) must be projected from the child diagram input(s) to the input port of the containing node that is contained within the parent diagram. This continues until an affectable input point is reached, perhaps projecting all the way to the input ports of the top-level diagram.

Affectable input points are either inputs to the diagram or are designated locations (e.g., a selected node or arc in the diagram), including embedded nodes, where inputs may be specified during testing. Similarly, the term "measurable observation points" is used to describe either outputs of the diagram or are designated locations where outputs may be observed during testing. A designated location may be selected by a user, such as by using an input device to select a node or arc of a display of the diagram, by editing a testing script file, and/or by entering in one or more commands to designate a location.

The use of affectable input points and/or measurable observation points may aid testing efforts by allowing a user to select a portion or portions of a diagram (instead of the entire diagram) for test generation and possible test execution. A portion of the diagram may be selected by designating one or more locations as affectable input points and/or by designating one or more locations as measurable observation points. The test generator may then generate tests for only the selected portion(s) of the diagram, which both allows the user to concentrate and speed testing efforts on a portion of the diagram, rather than the whole diagram.

At block 640, the test generator propagates expected outputs forward from the associated node to the measurable observation points such that the values specified in the test-generation templates are fully attributable at the observation points.

The test generator may examine the semantics of the associated node to determine which inputs to the node are required. For example, suppose the associated node is a statechart node that receives inputs "I1", "I2", and "I3" and generates outputs "O1" and "O2" by performing the following processing:

$$O1 = I1 * I2 + 3;$$

$$O2 = I2 - I3;$$

If the only expected output required from the statechart node was O1, then the only inputs needed are I1 and I2. Similarly, if the only expected output is O2, then the only inputs needed are I2 and I3.

Before projecting outputs forward, the test generator may perform the processing of the associated node to determine specific output values to be propagated. Continuing the example above, suppose the values of I1, I2, and I3 were determined to be 10, 20, and 30, respectively. Then, the test generator may determine that O1 is I1*I2+3=203 and O2 is I2−I3=−100, based on the processing indicated in the associated node.

As indicated in the example above, multiple inputs may be needed to determine, and thus propagate an attributed output value through a node. If some, but not all of the inputs to the node are projected to effectible input points, the test generator may need to determine the values (or ranges of values) of inputs not already projected before propagating the output from the node.

The test generator may use notation-specific methods to determine the inputs not already projected. For example, with statecharts, forward-propagation and/or backward-propagation techniques disclosed in the Statechart Application may determine the inputs not already projected. The backward-propagation techniques used may depend on the semantic notations used in the diagram. Also, the backward-propagation technique may be performed, in part, by querying test-generation results.

For example, suppose an internal diagram of a node is written using statechart notation and the node is embedded in a diagram primarily written using data-flow notation. As a by-product of statechart test generation, backward and forward data-flow signal propagation specifications are automatically created for a statechart by use of forward-propagation and/or backward-propagation passes through the statechart.

The forward-propagation pass and the backward-propagation pass generate test cases based on statechart-input values and statechart-output values. In the context of a data-flow diagram, the statechart-input values may be specified as values at an input port of a block of the data-flow diagram that is represented using the statechart. Similarly, the statechart-output values may be specified as values at an output port of a block represented using the statechart. Statechart-input values and statechart-output values may be specified in terms of a specific value or values (e.g., input1=4 or output1=7, 20), ranges of values (e.g., input1=[120,200]) and combinations of specific value(s) and range(s) of values (e.g., input1=4, 7, [10, 50] or output1=2, 6, [12, 52], [120,200]).

For some statecharts, large numbers of test cases may be generated. As such, the test cases may be queried to determine a specific subset of the test cases. Queries of the test cases may be based on the one or more statechart-input values and/or one or more statechart-output values. In particular, a query may be made of the test cases based on a specific input value or specific output value; e.g., input1=145 or output1=269. As with statechart-input and statechart-output values, queries may also be made using specific values and/or ranges of values (e.g., a query may specify input1=[120,200] or output1=2, 6, [12, 52], [120,200]).

In particular, a query may be formed for a input without a range or an infinite range (e.g., input1=[−∞,+∞]) to determine a node where the queried input was determined. Based on the results of the query, the test generator may determine a source node where the queried input was first determined and then project the queried input from the source node to the associated node.

At block 650, the test generator generates tests based on the projected inputs and/or propagated outputs. The projected inputs and/or propagated outputs may be included in the selected test-generation template. Then, a test vector may be generated based on the projected inputs and/or propagated outputs. One or more tests may then be generated from the test vector; for example, the generated one or more test may be (copies of) the test vector. The generated tests may then be recorded, such as in the memory of the test generator, to an electronic file of generated tests, on a printed or otherwise permanent record, and/or electronically transmitted to another computing device.

At block 660, a determination is made as to whether there is another test-generation template to process. For example, the determination may be made by determining that the test-generation-template data structure used to hold test-generation templates is not empty. As another example, the test-generation-template data structure could be scanned to see if all test-generation templates are marked as "selected" and therefore all test-generation templates have been processed. Many other techniques for determining if there are test-generation templates to be processed are possible. If there is another test-generation template to be processed, method 600 may proceed to block 620. If there are no test-generation templates to be processed, method 600 may end.

CONCLUSION

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

The invention claimed is:

1. A method for generating tests, comprising:
   initializing a test generator;
   inputting a diagram representing requirements for a system-performing device comprising a plurality of nodes, including a plurality of embedded nodes, and a plurality of arcs, each arc connecting one or more of the plurality of nodes, and wherein each node in the plurality of nodes belongs to a primary semantic notation except for the plurality of embedded nodes, wherein each embedded node in the plurality of embedded nodes comprises at least one sub-diagram belonging to a secondary semantic notation that is not the same as the primary semantic notation;

propagating type and range information (TRI) through the diagram and determining a plurality of test-generation templates for each node in the plurality of the nodes using a propagation method, wherein TRI is propagated and test-generation templates generated based on the primary semantic notation for each node in the plurality of nodes except for the plurality of embedded nodes, and wherein the TRI is propagated and test-generation templates for each embedded node in the plurality of embedded nodes are generated based on the semantic notation of the at least one sub-diagram; and generating tests for the diagram based on the plurality of test-generation templates.

2. The method of claim 1, wherein propagating TRI information through the diagram and determining a plurality of test-generation templates comprises performing a propagation method that comprises:

inserting at least one node of the plurality of nodes of an input diagram into a TRI-propagation queue, wherein the input diagram is a subset of the diagram;

selecting test-generation procedures based on the semantic notation of the input diagram; and while the TRI-propagation queue is not empty, performing:
(i) selecting a node from the TRI-propagation queue,
(ii) removing the selected node from the TRI-propagation queue,
(iii) determining if the selected node is a designated node,
(iv) responsive to determining the selected node is a designated node, propagating TRI through the selected node and determining a test-generation template for the selected node using the selected test-generation procedures, and
(v) responsive to determining the selected node is an undesignated node, recursively calling the propagation method using the selected node as an input diagram and then post-processing the selected node, wherein the post-processing of the selected node is based on the semantic notation of the selected node.

3. The method of claim 2, wherein determining a node is a designated node comprises making a default determination that the embedded node is an undesignated node.

4. The method of claim 2, wherein selecting a node from the TRI-propagation queue further comprises determining if all nodes upstream from the selected node have been processed.

5. The method of claim 2, wherein responsive to the determination that all nodes up-stream from the selected node have not been processed, selecting a new selected node from the TRI-propagation queue, wherein the new selected node differs from the selected node.

6. The method of claim 1, further comprising:
determining if at least one generated test is to be executed; and
responsive to determining the at least one generated test is to be executed, executing the at least one generated test.

7. The method of claim 1, wherein generating tests for the diagram based on the plurality of test-generation templates comprises:
(i) selecting a test-generation template from the plurality of test-generation templates;
(ii) projecting inputs up-stream of the selected test-generation template to a plurality of affectable input points of the diagram;
(iii) propagating expected outputs down-stream from an associated node to a plurality of measurable observation points;
(iv) recording a generated test based on the projected inputs and the propagated expected outputs;
(v) determining another test-generation template in the plurality of test-generation templates is to be processed; and
(vi) responsive to determining another test-generation template is to be processed, performing steps (i)-(iv) for the another test-generation template.

8. The method of claim 7, wherein at least one affectable input point of the plurality of affectable input points is a designated location of the diagram.

9. The method of claim 7, wherein at least one affectable input point of the plurality of affectable inputs is an input to the diagram.

10. The method of claim 7, wherein at least one measurable output point of the plurality of measurable output points is a designated location of the diagram.

11. The method of claim 7, wherein at least one measurable output point of the plurality of measurable output points is an output of the diagram.

12. A method for generating tests representing requirements for a system-performing device from a diagram comprising a plurality of nodes, including a plurality of embedded nodes, and a plurality of arcs, each arc connecting one or more of the plurality of nodes, wherein each node in the plurality of nodes belongs to a primary semantic notation except for the plurality of embedded nodes, and wherein each embedded node in the plurality of embedded nodes comprises at least one sub-diagram belonging to a secondary semantic notation that is not the same as the primary semantic notation, the method comprising:

receiving a plurality of test-generation templates into a test-generation-template data structure, each test-generation template representing an associated node of the diagram;

selecting a test-generation template from the test-generation-template data structure and an associated node for the test-generation template;

updating the test-generation-template data structure based on the selected test-generation template;

projecting inputs up-stream along a first path from the associated node to a plurality of affectable input points based on the semantic notation of nodes in the first path;

propagating expected outputs down-stream along a second path from the associated node to a plurality of measurable observation points based on the semantic notation of nodes in the second path;

generating a test based on the projected inputs and propagated outputs; and determining that another test-generation template in the plurality of test-generation templates is to be processed based on the test-generation-template data structure.

13. The method of claim 12, further comprising:
responsive to determining all test-generation templates have been processed, executing a generated test out of the plurality of generated tests.

14. The method of claim 13, wherein executing a generated test comprises:
selecting a generated test of the plurality of tests to execute; and
executing the selected test.

15. The method of claim 12, further comprising:
selecting a portion of the diagram, and
generating tests for the selected portion of the diagram.

16. The method of claim 15, wherein selecting a portion of the diagram comprises selecting at least one affectable input and at least one measurable observation point for the diagram.

17. A test generator, comprising:
a computer processor;
data storage;
machine-language instructions stored in the data storage and executable by the computer processor to perform functions including:
initializing the test generator,
inputting a diagram representing requirements for a system-performing device comprising a plurality of nodes, including a plurality of embedded nodes, and a plurality of arcs, each arc connecting one or more of the plurality of nodes, wherein each node in the plurality of nodes belongs to a primary semantic notation except for the plurality of embedded nodes, and wherein each embedded node in the plurality of embedded nodes comprises at least one sub-diagram belonging to a secondary semantic notation that is not the same as the primary semantic notation
propagating type and range information (TRI) through each node in the plurality of nodes based on a semantic notation used by the node,
determining a plurality of test-generation templates for each node in the plurality of nodes based on the semantic notation used by the node, and
generating tests for the diagram based on the plurality of test-generation templates.

18. The test generator of claim 17, wherein the functions further comprise:
determining if a generated test is to be executed.

19. The test generator of claim 18, wherein the functions further comprise:
responsive to determining a generated test should be executed, executing the generated test.

20. The test generator of claim 17, wherein selecting a node from the TRI-propagation queue further comprises determining if all nodes up-stream from the selected node have been processed.

\* \* \* \* \*